United States Patent [19]

Mallison

[11] Patent Number: 5,390,540
[45] Date of Patent: Feb. 21, 1995

[54] CONTROL APPARATUS FOR THE UNIFORMITY MACHINE

[75] Inventor: Frank K. Mallison, Akron, Ohio
[73] Assignee: Akron Special Machinery, Inc., Akron, Ohio
[21] Appl. No.: 81,237
[22] Filed: Jun. 25, 1993

Related U.S. Application Data

[63] Continuation-in-part of Ser. No. 828,554, Jan. 31, 1992, abandoned.

[51] Int. Cl.⁶ .................... E01C 23/00; G01M 17/02
[52] U.S. Cl. .................................................. 73/146
[58] Field of Search ........................................ 73/146

[56] References Cited

U.S. PATENT DOCUMENTS

| | | | |
|---|---|---|---|
| 4,852,398 | 8/1989 | Cargould et al. | 73/146 |
| 4,971,128 | 11/1990 | Koga et al. | 157/21 |
| 5,029,467 | 7/1991 | Cargould et al. | 73/146 |
| 5,107,703 | 4/1992 | Ota | 73/146 |

Primary Examiner—Herbert Goldstein
Assistant Examiner—William L. Oen
Attorney, Agent, or Firm—Reese Taylor

[57] ABSTRACT

A method of controlling movement of the lower chuck of a tire uniformity machine toward the upper chuck by controlling acceleration and deacceleration of the lower chuck in response to pressure encountered during its movement. One embodiment of the apparatus utilizes a low-range pressure switch connected to a pump which activates a cylinder driving the lower chuck and which senses the pressure and controls the pump in response thereto. This embodiment also employs a high-range pressure switch for sensing closing pressure. Another embodiment substitutes a linear displacement transducer and linear electrohydraulic servo actuator for the switches.

7 Claims, 5 Drawing Sheets

CONTROL APPARATUS FOR THE UNIFORMITY MACHINE

This application is a continuation in part of my earlier filed application Ser. No. 828,554, filed Jan. 31, 1992, now abandoned for CONTROL APPARATUS FOR TIRE UNIFORMITY MACHINE.

BACKGROUND OF THE INVENTION

This invention relates in general to tire uniformity machines and more particularly relates to a control system for controlling the raising and lowering of the lower chuck of a tire uniformity machine to reduce cycle time while protecting the chuck against damage.

DESCRIPTION OF THE PRIOR ART

Tire uniformity machines are well-known in the tire production art. Examples can be seen in Cargould U.S. Pat. Nos. 4,852,398 and 5,029,467. The function of these machines is also well-known in the art and is essentially to measure run-out and radial and lateral force variations, thereby insuring a uniform finished product.

These machines in general include upper and lower chucks between which the tires to be tested are inserted, with the lower chuck being connected to a hydraulically-operated piston and cylinder arrangement which raises and lowers the lower chuck so that the tire may be trapped between the upper and lower chucks during the testing process.

Also conventional to machines of this type is a conveyor for delivering tires to be tested to a position between the upper and lower chucks and over the lower chuck prior to testing and to convey the tires away following testing.

A further conventional arrangement in machines of this type is the provision of inflation means for inflating the tire once the chucks are brought together or closed and a laterally positioned loadwheel which can be moved radially inward and outward into and out of engagement with the tire. Means for driving or rotating the upper chuck during the testing operation are also commonly provided.

Since it is now conventional practice to test all vehicle tires before shipping, obviously speed in the cycle time for the testing is of the essence. This testing is generally a continuous process and reducing the time required to handle each tire is highly desirable.

Cargould U.S. Pat. No. 5,029,467 describes and discloses a means for reducing cycle time primarily by connecting an accumulator to the pump line to increase the volume of hydraulic fluid per unit of time that is delivered to the chuck cylinder and thus reduce cycle time for the operation of the lower chuck as it is brought up and into engagement for the testing operation. There is no doubt but what speeding up the lower chuck movement in this fashion will reduce cycle time. However, still further improvements in the efficiency of operation of such machines are believed to be attainable.

Thus, it should be noted that the operation is such that the chuck comes up rapidly for most of its travel and then slows for the last bit of movement so as to be sure the chucks are properly aligned before final seating. However, with most of the prior art, the controlling factor is distance traveled by the cylinder. That is to say that the cylinder operates in an on-off mode in response to the distance traveled by the piston rod with the switching function being preset based upon that factor.

The difficulty is that occasionally tires are mischucked or have foreign materials in or on them. With the travel of the lower chuck being controlled solely based on the distance traveled, the usual limit switches cannot respond to these circumstances and, therefore, it is possible and, in fact, often happens that a mischucked tire can be destroyed, and further, it is very much possible that, if a foreign object is either disposed in the opening between the two chucks or within the tire itself, the chucks themselves can be destroyed and damage can occur to other components of the machine.

Various sensors, light beams, etc., are sometimes employed to ensure that tires are properly centered. However, these are costly and also must be reset for varying tire sizes and cannot sense foreign material in or on the tire.

The obvious cost of replacing the chucks is a serious problem, not to mention the cost of downtime encountered when chucks have to be replaced. Furthermore, aluminum chucks are much cheaper and easier to change and, therefore, are desirable. However, they are even more easily destroyed by a mischuck of the tire and, therefore, users tend to utilize steel chucks, which are more expensive and harder to handle, because of the danger of damage.

It is also a fact that, as these machines are normally constructed, various sensing and operational apparatus are located in close proximity to the chucked tire. Since the tire is rotated under power during testing, destruction of the tire can also cause destruction of or damage to this apparatus, thus further increasing the cost of such misadventure.

Therefore, while increasing speed in the chuck raising and lowering operation enhances the overall operation and is a desirable goal, the increased speed increases the possibility of damage. Therefore, it is desirable to minimize the possibility of damage without sacrificing speed of operation.

SUMMARY OF THE INVENTION

It is accordingly an object of this invention to produce a means of controlled acceleration of the operating cylinder, responsive not to distance traveled, but to pressure encountered. In that way, mischucking can be sensed and the cylinder can be shut down and, additionally, foreign objects in the path of the lower chuck can be sensed and the system shut down before damage to the tire and the machine can occur.

It has been found that such a means of controlled movement can be achieved by providing a low-range pressure switch to sense any obstruction during the closing cycle and stop the machine if an unacceptable increase in pressure is encountered.

It has further been found that a near closed limit switch can be employed to take the low-range pressure switch out of the circuit when the chuck is nearly closed and that an adjustable, pressure operated check valve can be provided to prevent damage to the low-range pressure switch during the high pressure portion of the cycle.

It has further been found that a high pressure switch can be provided to sense the increase in pressure signifying that the chuck is closed and signal the inflation valve to open to begin the testing operation.

Therefore, production of an improved tire uniformity machine control mechanism of the type abovedescribed becomes the principal object of this invention with other objects thereof becoming more apparent upon a reading of the following brief specification and claims considered and interpreted in view of the accompanying drawings.

BRIEF DESCRIPTION OF THE PREFERRED EMBODIMENTS

Figure 1:
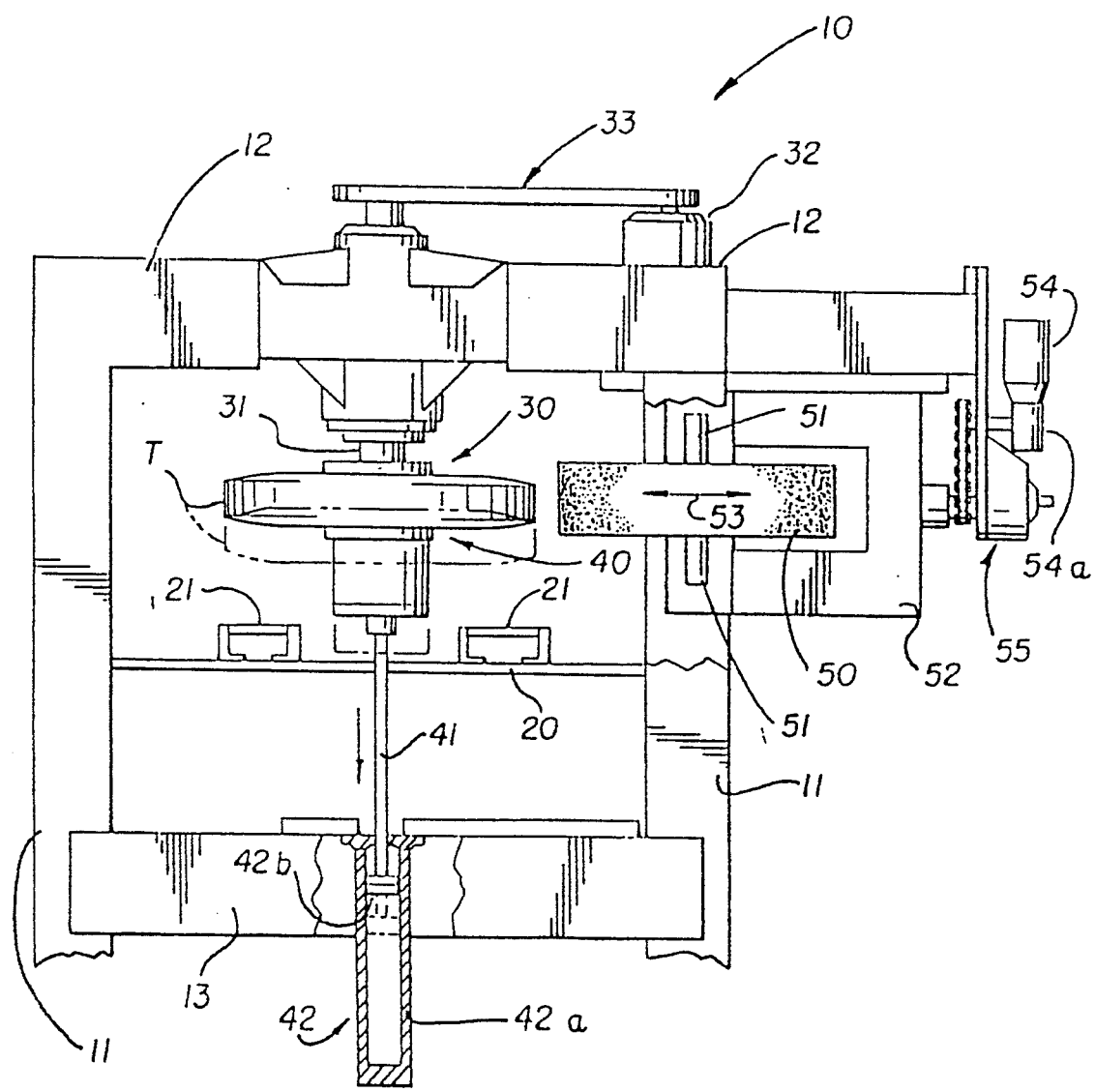
FIG. 1 is an elevational view, partially schematic, showing a conventional tire uniformity machine.

Referring first to FIG. 1 of the drawings, it will be seen that the tire uniformity machine, generally indicated by the numeral 10, includes a framework which essentially includes vertical frame members 11,11, a top frame 12 and a bottom frame 13 with the usual construction arranging these so as to form an open cube or box for support of the remaining apparatus.

This framework thus supports a horizontally disposed conveyor 20 which includes a plurality of rollers 21,21 so that the tire T can be brought into the interior of the framework, transferred to the lower chuck, raised, tested and then lowered and removed from the interior of the framework. Such conveyors are old and well-known to those skilled in the art.

Still referring to FIG. 1, it will be seen that an upper chuck assembly 30 is mounted on a spindle 31 carried by the upper frame members and driven by a motor 32 through a drive pulley and timing belt arrangement generally indicated by the numeral 33. Again, the means for rotating the upper spindle is well-known in the art and will not be described or illustrated in great detail herein.

The lower chuck assembly 40 is mounted on a piston rod 41 which is attached to a hydraulic actuator generally indicated by the numeral 42. That actuator includes a cylinder 42a and a piston 42b reciprocal within the cylinder so as to raise and lower the lower chuck assembly 40, as is, again, well-known in the prior art and, thus, not described or illustrated in detail.

Completing the description of the typical tire uniformity machine shown in FIG. 1, it will be seen that a loadwheel 50 is mounted for reciprocating movement in the direction of the arrow 53 into and out of engagement with the tire T. This loadwheel 50 is mounted on spindles 51,51 for free rotation. Spindles 51,51 are carried on a carriage 52 which is driven in the direction of the arrow 53 by a reversible motor 54 through a gear box 54a and a chain sprocket drive and ball screw assembly 55. The means for moving the loadwheel in and out of engagement with the tire T is well-known in the art and, again, will not be described in great detail.

Figure 2:
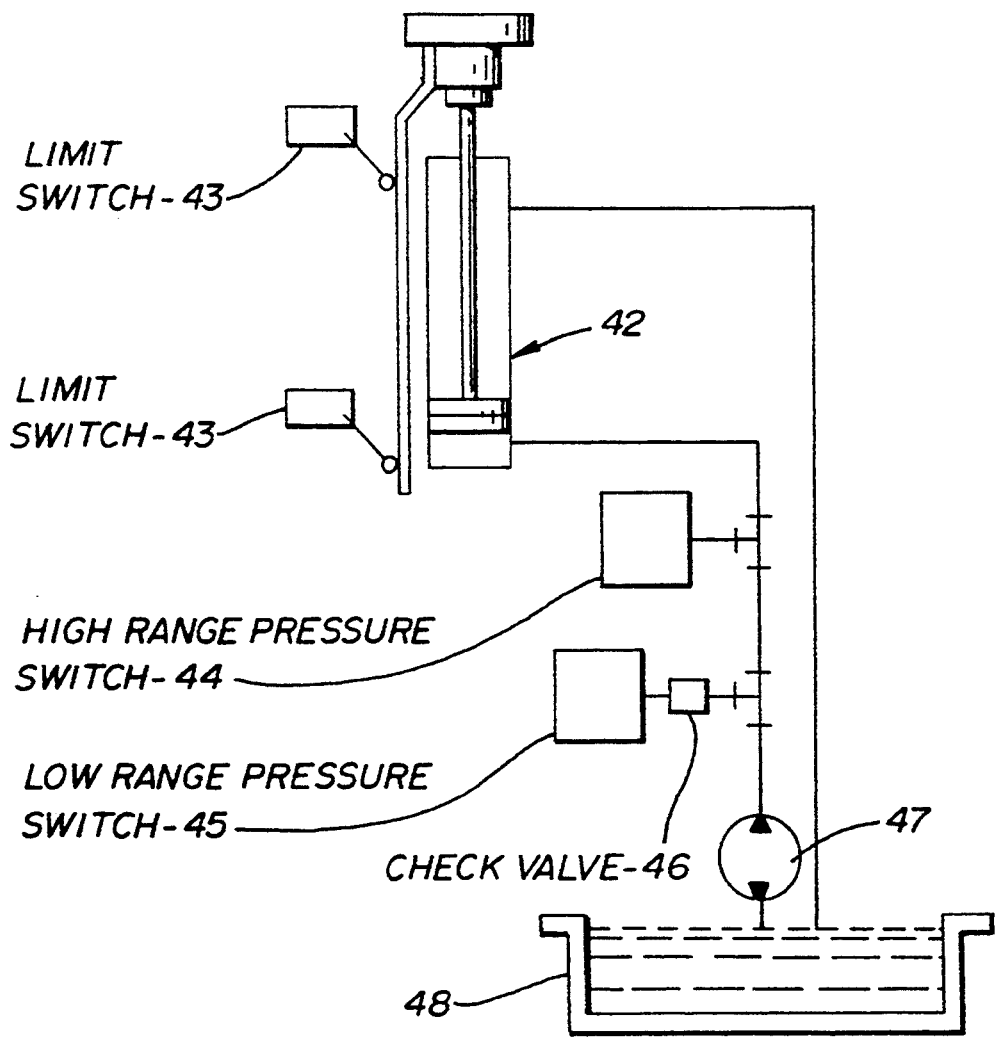
FIGS. 2 and 4 are schematic views of the control apparatus utilizing limit switches and hydraulic or pressure switches to control travel of the lower chuck.
Figure 4:
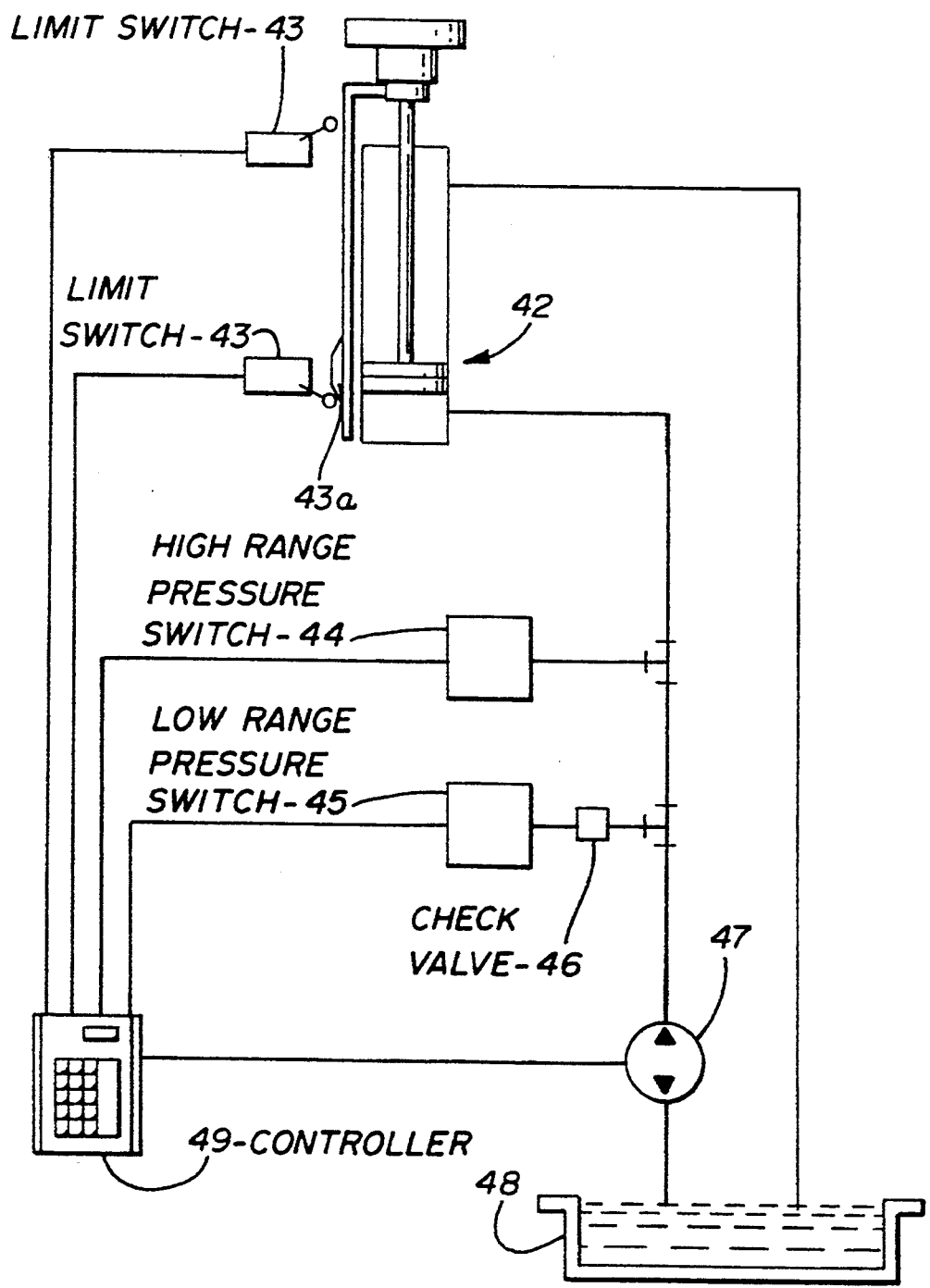

Turning then to FIGS. 1, 2 and 4 of the invention for a consideration of one embodiment of the invention, it will be seen that means are illustrated for controlling movement of the lower chuck assembly 40 toward the upper chuck assembly 30 prior to testing and in the reverse direction after testing.

These means include limit switches 43,43, a high-range pressure switch 44 and a low-range pressure switch 45 which is connected to an adjustable, pressure operated check valve 46. These switches and valve are interposed in the hydraulic line from the pump 47 which, in turn, is connected to the hydraulic reservoir 48.

The limit switches 43,43, in conjunction with cam surfaces 43a,43a (see FIG. 4) are positioned to detect the position of the piston of the hydraulic actuator and convey that information to the controller or CPU 49. Similarly, the pressure switches 44,45 will detect line pressure and convey that information to controller 49. The controller 49 is operatively connected to pump 48 and will control its operation in a predetermined, pre-programmed manner based on the information received from the limit and pressure switches as will now be described.

In operation, assuming a tire T to have been moved into position over lower chuck 40 by conveyor 20, it will be seen that the control system of FIG. 2 operates by energizing the pump 47 and it will be understood that for a short distance, for example, approximately the first two inches of cycle travel, the pressure switches 44 and 45 are bypassed. This enables the initial inertia of the lower chuck to be overcome and closing to begin.

As the piston rod 41 and the lower chuck assembly 40, carrying the tire T, moves up, the low-range pressure switch 45 senses any obstruction during the closing cycle by sensing the increased pressure caused thereby. If such increased pressure beyond a predetermined level is encountered, the low-range pressure switch 45 will be activated and cause the machine to shut down, enabling the problem to be corrected without damage to the machine or tire. For example, if the tire is not properly centered, much damage can occur. Such damage can occur not only to the tire, but to the chucks, load cells, probes, centering arms, precision spindles, bearings and photo eyes usually carried by the framework. With the present invention, if the low-range pressure switch 45 encounters any resistance or pressure out of its range, it simply stops the operation. That enables the obstruction to be cleared or the mischucking to be cured before resuming operation.

In a typical operation, the low pressure switch will be set so that the switch will operate so that no significant damage would occur if an obstruction were encountered. If that pressure level is exceeded, the system will be deactivated. It will be understood that the actual pressure setting will vary from machine to machine due to variations in cylinder bores and hydraulic circuits. However, one with ordinary skill in this art can readily determine the appropriate setting for a given machine.

Continuing a description of the operation of the embodiment of FIG. 2, at a predetermined point, near the closed position, a near closed limit switch 43 cuts the low-range pressure switch 45 out of the circuit. The high-range pressure switch 44 then senses that the chuck is closed by sensing the increased pressure caused thereby, at which time the air valve to inflate the tire (not shown) can be actuated. This eliminates using a mechanical limit switch to sense when the chucks are closed which is an advantage since such switches are difficult to properly position.

Essentially, the low-range pressure, high volume switch 45 is operative for rapid closure during most of the cycle and the high-range pressure, low volume switch 44 is operative for chuck seating movement. It will also be noted that an adjustable, pressure operated check valve 46 is interposed in the line to prevent damage to the low-range pressure switch 45 through overload during the high pressure portion of the operating cycle.

Such an arrangement permits rapid closing and, therefore, reduces cycle time, but interjects a safety feature into the system, enabling a more rapid cycle to be operated with confidence.

Such an arrangement also eliminates the need for light beams or other centering means commonly used to avoid miscentering inasmuch as the present invention provides adequate protection against machine damage in that event.

Figure 3:
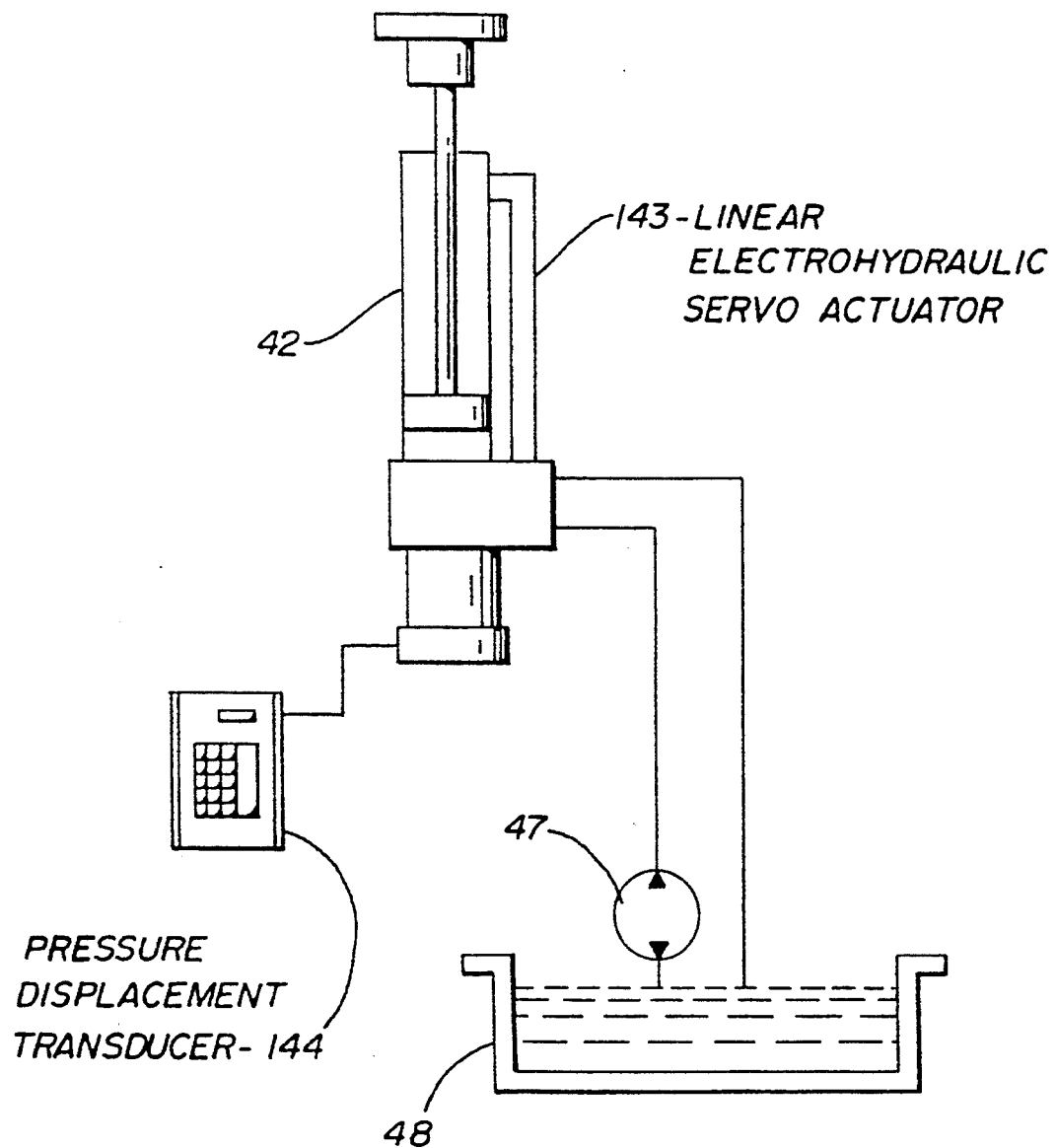
FIGS. 3 and 5 are schematic views similar to FIGS. 2 and 4 showing utilization of transducers and an electrohydraulic linear activator to control travel of the lower chuck.
Figure 5:
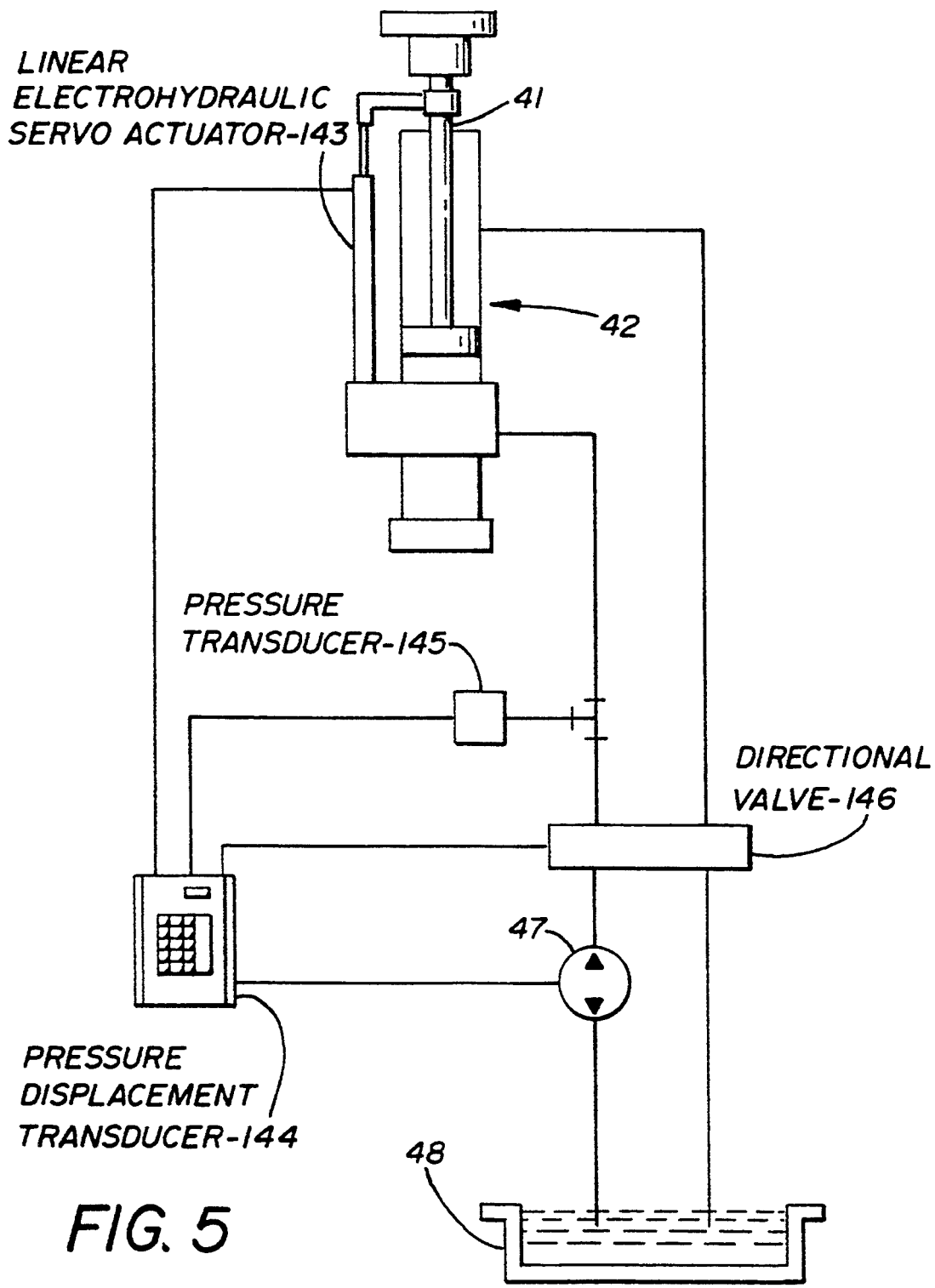

FIGS. 3 and 5 illustrate a modified form of the invention in which the limit switches 43,43 are replaced by a linear electrohydraulic servo actuator 143 and the hydraulic pressure switches 44 and 45 are replaced by pressure displacement transducers 144 to control acceleration and deacceleration.

Here the linear electrohydraulic servo actuator 143 is used to detect the position of the piston of the hydraulic actuator and convey that information to the controller 49. Similarly, the pressure transducer 145 detects line pressure by reading voltage and conveys the information to controller 49. Controller 49 is connected to directional valve 146 and pump 48 and controls their operation based on the information received and in accordance with its program as will now be described.

In this form of the invention, the chuck position and pressure during closing and opening of the cylinder is sensed by the pressure and linear transducers 144 and acceleration and deceleration is controlled by the pump so that the cylinder can be run at high speed without shock at either end of the motion. The position signal is also used to take the low-range pressure switch out of the circuit and to activate the low-range pressure switch at the start of the closing cycle so that the cylinder friction does not cause the pressure switch to activate. This eliminates the need for the limit switches 43,43 of the FIG. 2 embodiment. In either embodiment, high speed operation can be utilized with complete confidence that unnecessary damage will not occur.

The linear electrohydraulic servo actuator 143 has not been illustrated or described in detail, but a suitable device has been found to be the T-J LESA I sold by Vickers, Incorporated, T-J Actuator Products, 2425 W. Michigan Avenue, Jackson, Mich. 49202. Similarly, a suitable transducer is the Temposonics II sold by MTS Systems Corporation, Sensors Division, Research Triangle Park, N.C. 27708.

While a full and complete description of the invention has been set forth in accordance with the dictates of the Patent Statutes, it should be understood that modifications can be resorted to without departing from the spirit hereof or the scope of the appended claims.

Thus, while certain operating pressures have been mentioned by way of example, the invention is not intended to be so limited.

Also, certain specific commercially available components have been referred to by way of example, but it will be understood that any comparable components having similar functional characteristics are within the scope of the invention.

What is claimed is:

1. In a tire testing machine having an upper chuck means and a lower chuck means movable through a cycle from an open to a closed position and back toward and away from the upper chuck means by a cylinder and pump, the improvement comprising:

a low-range pressure switch connected to the pump for controlling actuation of the cylinder in response to pressure encountered as the lower chuck means moves toward the upper chuck means during a substantial portion of the movement toward the upper chuck; and means for bypassing said low-range pressure switch thereafter.

2. The tire testing machine of claim 1 wherein a high-range pressure low volume switch is connected to said pump for sensing closing pressure between the upper and lower chucks after said low-range pressure switch has been bypassed.

3. The tire testing machine of claim 2 wherein an adjustable, pressure operated check valve is connected to said low-range pressure switch.

4. The tire testing machine of claim 1 wherein limit switches are associated with the cylinder to sense the position of the cylinder during operation thereof.

5. The tire testing machine of claim 4 wherein cam surfaces are disposed on the cylinder; and said limit switches are controlled by selective engagement with said cam surfaces.

6. In a tire testing machine having an upper chuck means and a lower chuck means movable toward and away from the upper chuck means by a cylinder and pump, the improvement comprising:

a linear displacement transducer connected to the pump for controlling actuation of the pump and the cylinder through a linear electrohydraulic servo actuator, connected to said linear displacement transducer and to the cylinder, in response to pressure encountered as the lower chuck means moves toward the upper chuck means whereby movement of the lower chuck means by the pump can be interrupted when a predetermined pressure is detected by the linear electrohydraulic servo actuator.

7. A method of controlling the closure of opposed chucks in a tire testing machine by sensing pressure encountered during such closure and selectively continuing such closure in response to acceptable, predetermined pressure readings or aborting such closure in response to unacceptable, predetermined pressure reading.

* * * * *

UNITED STATES PATENT AND TRADEMARK OFFICE
CERTIFICATE OF CORRECTION

PATENT NO. : 5,390,540
DATED : February 21, 1995
INVENTOR(S) : Frank K. Mallison It is certified that error appears in the above-identified patent and that said Letters Patent is hereby corrected as shown below:

On the title page item [54], delete "THE" and substitute therefor ---TIRE---;

In Column 1, line 1, in the title, delete "THE" and substitute therefor ---TIRE---; and In Column 6, lines 57-58, delete "reading" and substitute therefor ---readings---.

Signed and Sealed this

Sixth Day of June, 1995

Attest:

BRUCE LEHMAN

Attesting Officer    Commissioner of Patents and Trademarks